Feb. 23, 1943.  A. J. LAUTMANN  2,311,923
COUGH DROP
Filed June 8, 1939  9 Sheets-Sheet 1
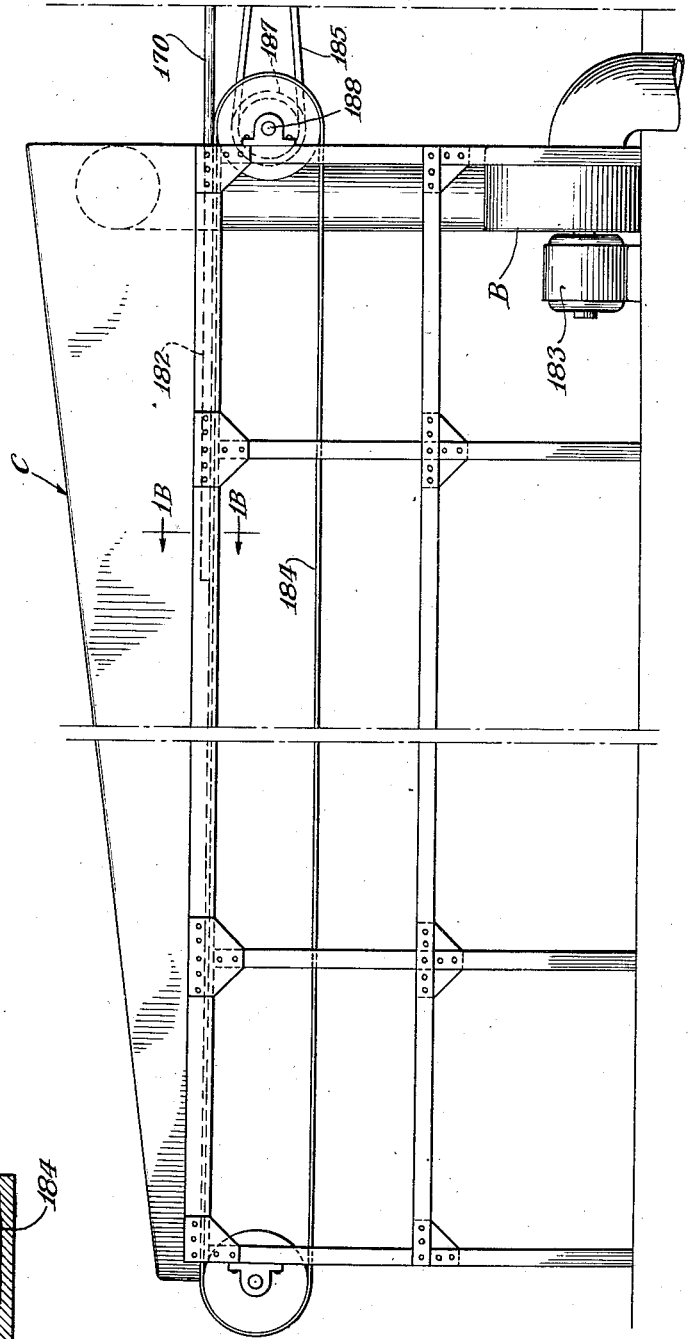
Inventor:
Alfred J. Lautmann
By Bell, Wallace and Cannon
Attorneys

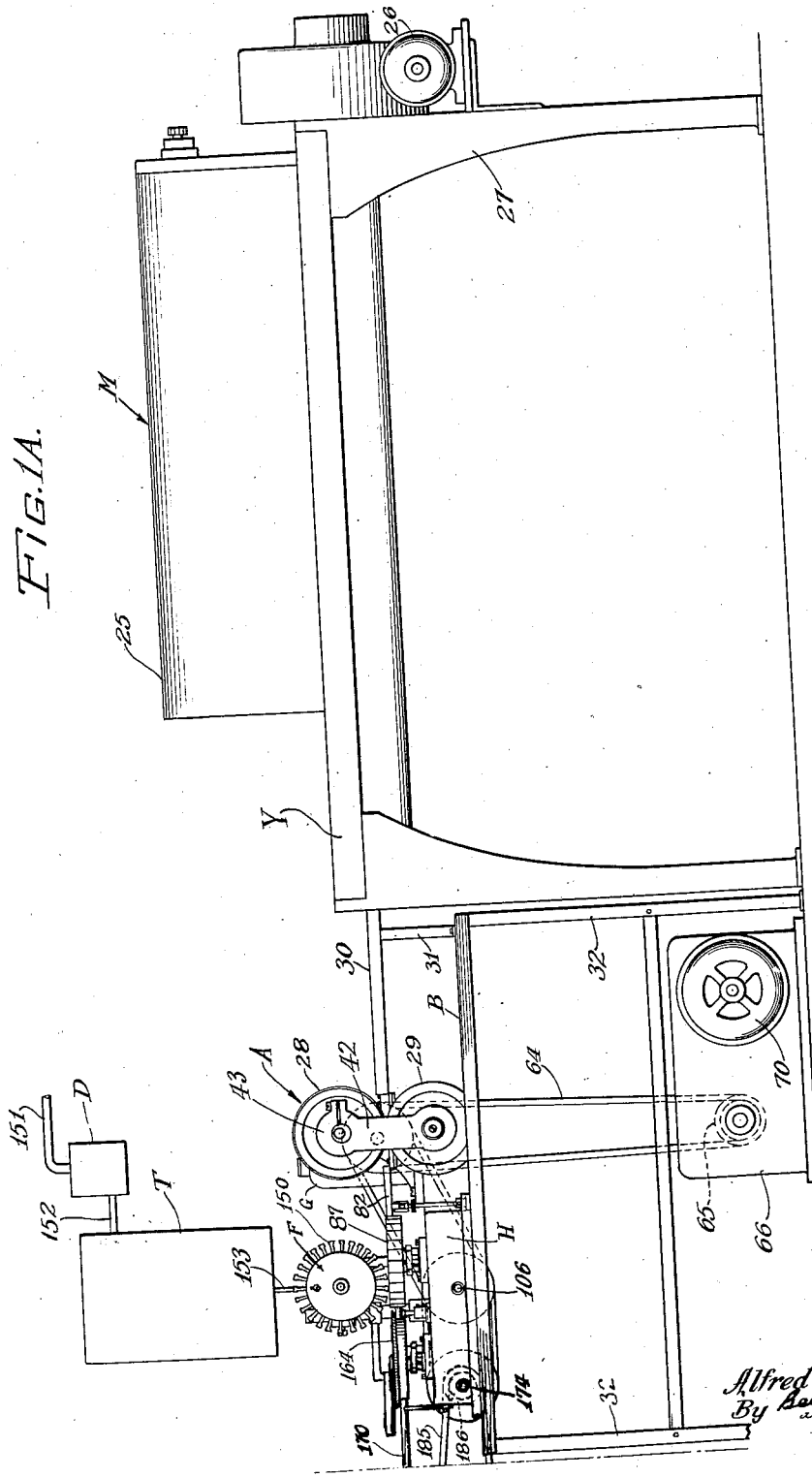

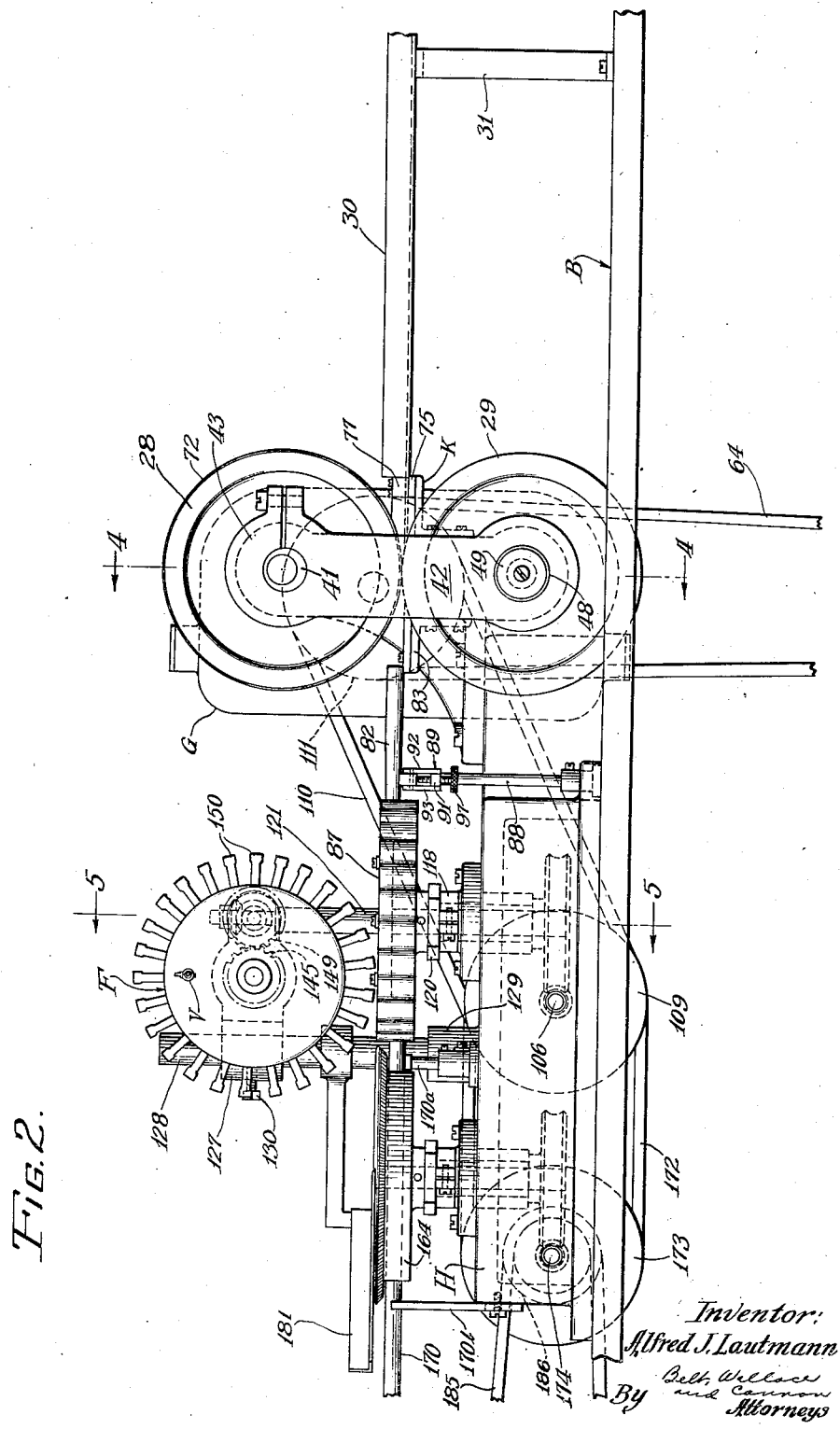

Feb. 23, 1943.  A. J. LAUTMANN  2,311,923
COUGH DROP
Filed June 8, 1939  9 Sheets-Sheet 4
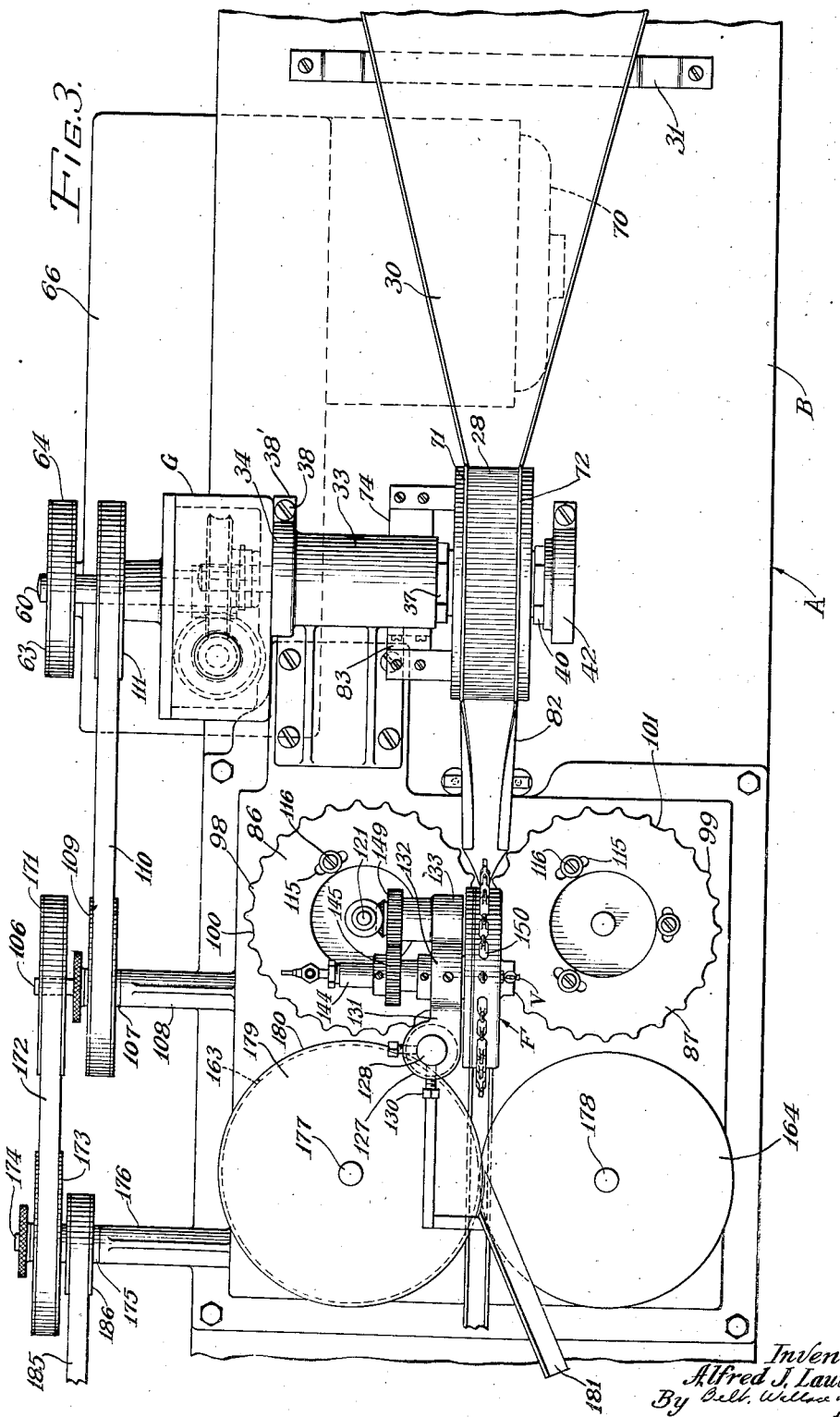
Inventor:
Alfred J. Lautmann
By Bell, Wallace and Cannon
Attorneys Feb. 23, 1943.    A. J. LAUTMANN    2,311,923
COUGH DROP
Filed June 8, 1939    9 Sheets-Sheet 5
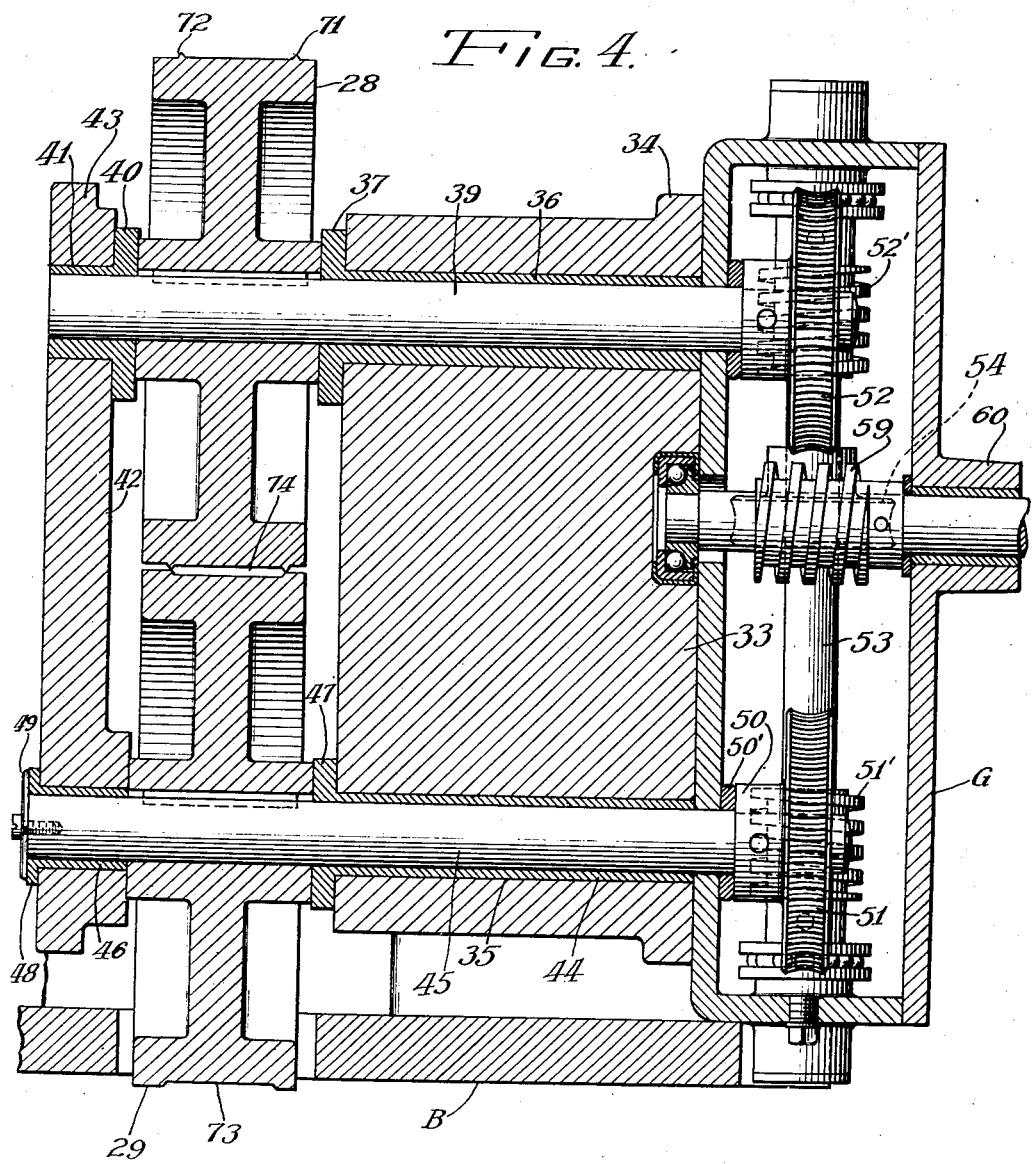
Inventor
Alfred J. Lautmann
By Belt, Wallace and Cannon
Attorneys

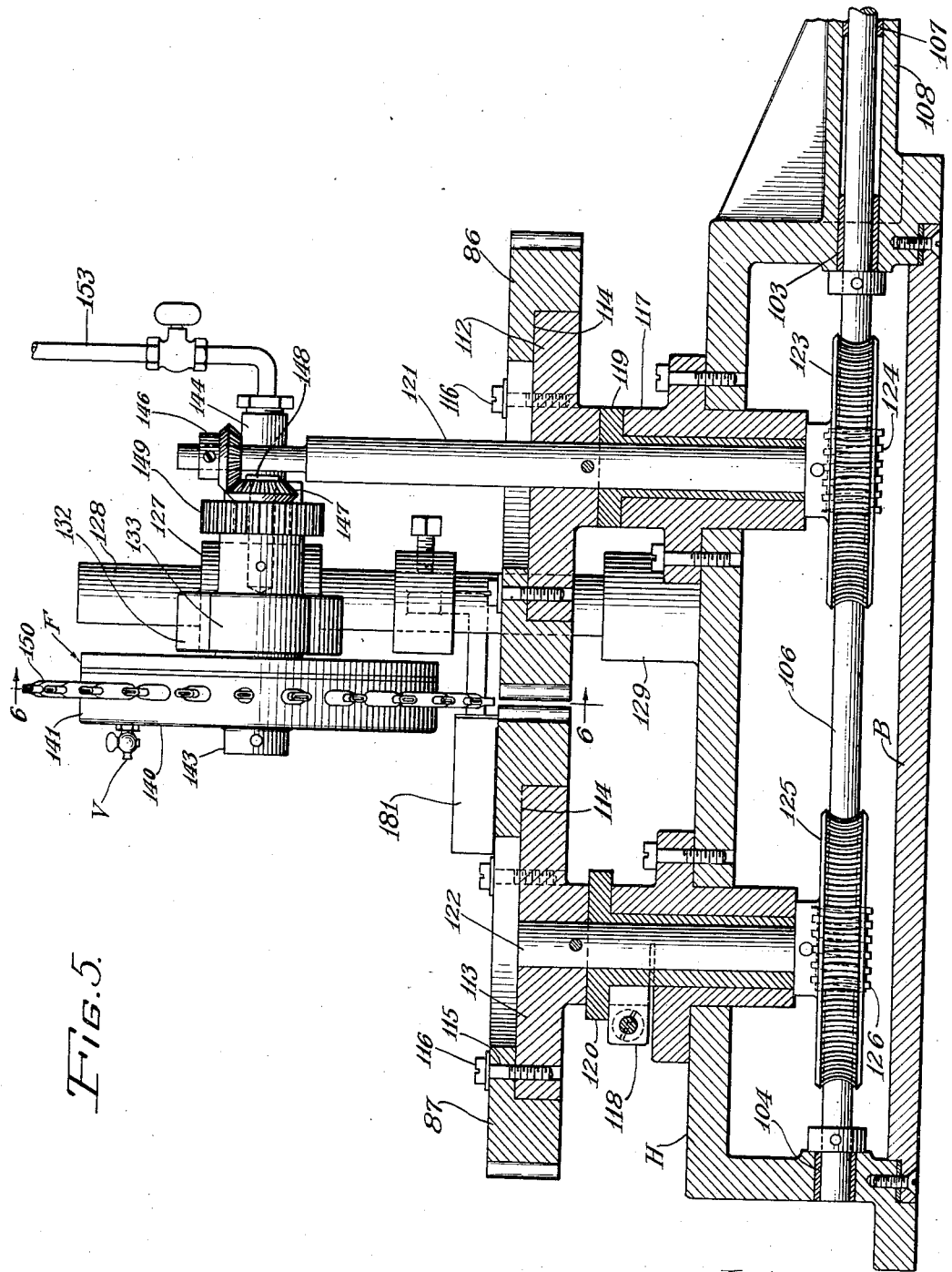

Feb. 23, 1943.  A. J. LAUTMANN  2,311,923
COUGH DROP
Filed June 8, 1939  9 Sheets-Sheet 7
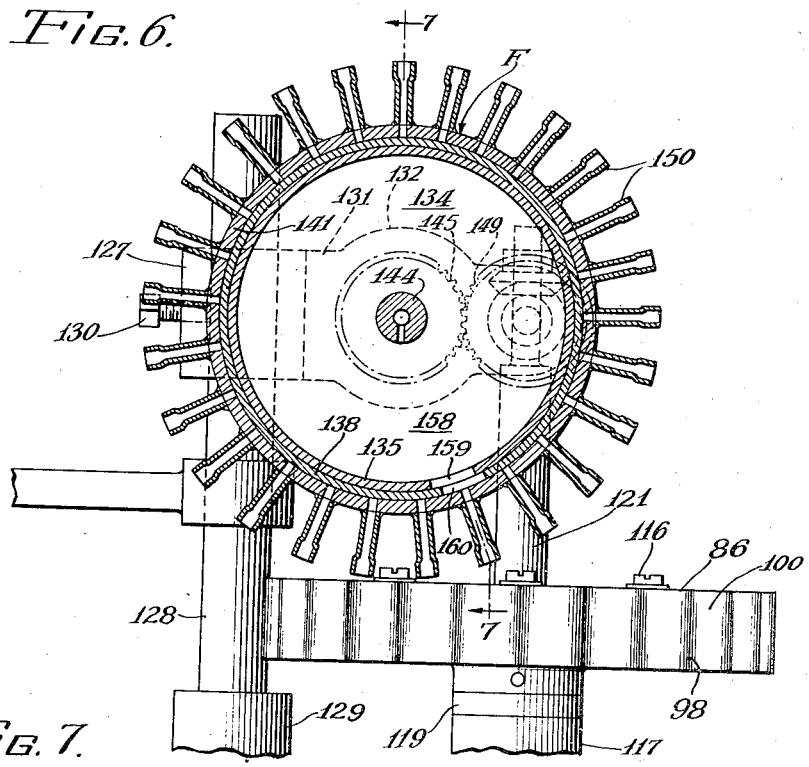
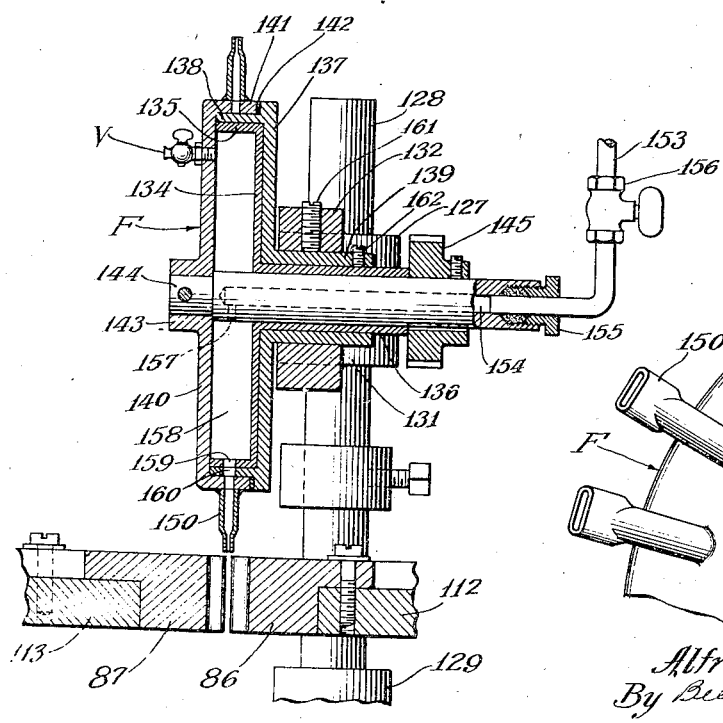
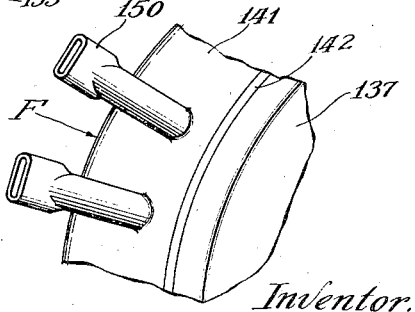
Inventor:
Alfred J. Lautmann
By Bell, Wallace and Cannon
Attorneys Feb. 23, 1943.   A. J. LAUTMANN   2,311,923
COUGH DROP
Filed June 8, 1939   9 Sheets-Sheet 8
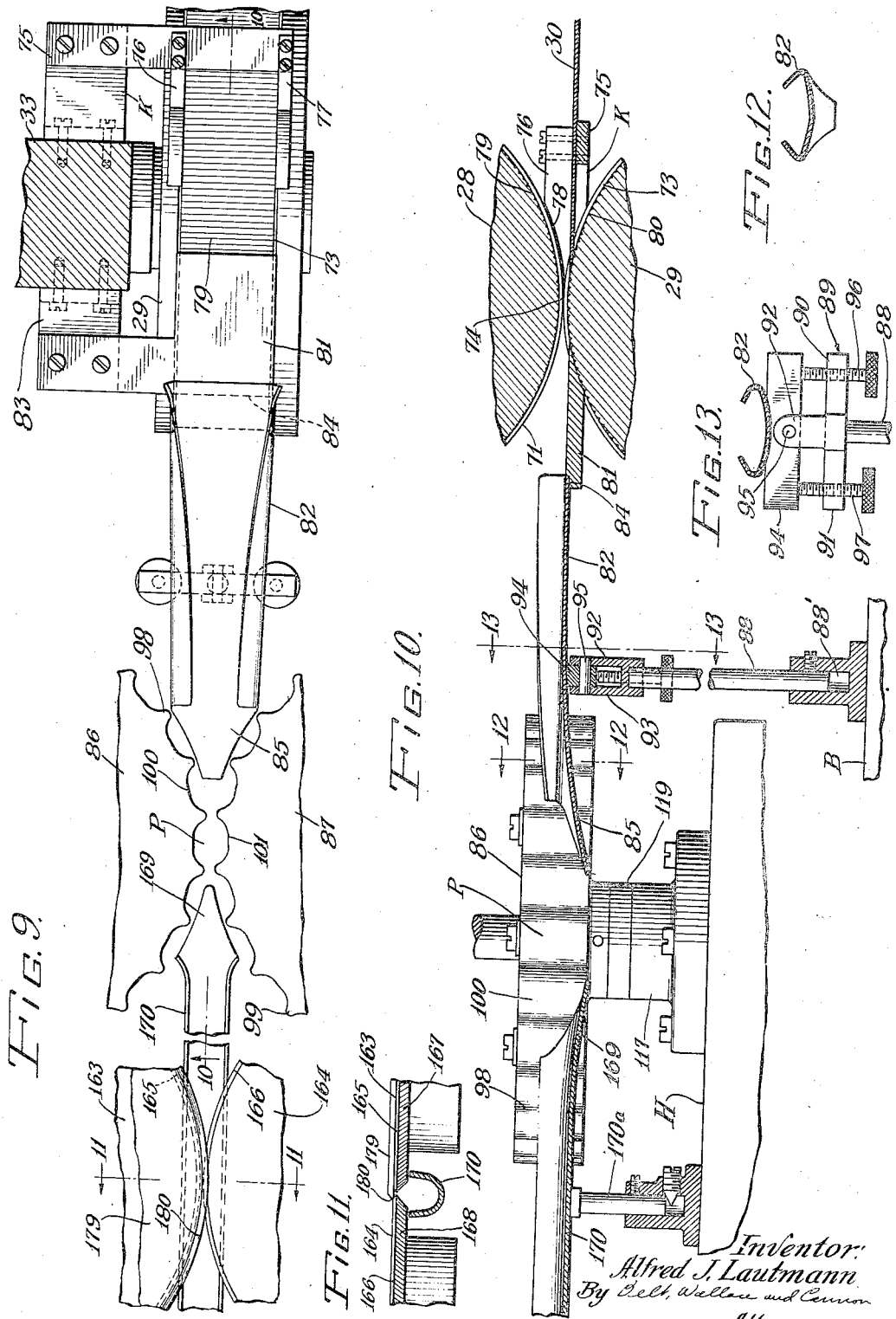

Feb. 23, 1943.　　A. J. LAUTMANN　　2,311,923
COUGH DROP
Filed June 8, 1939　　9 Sheets-Sheet 9
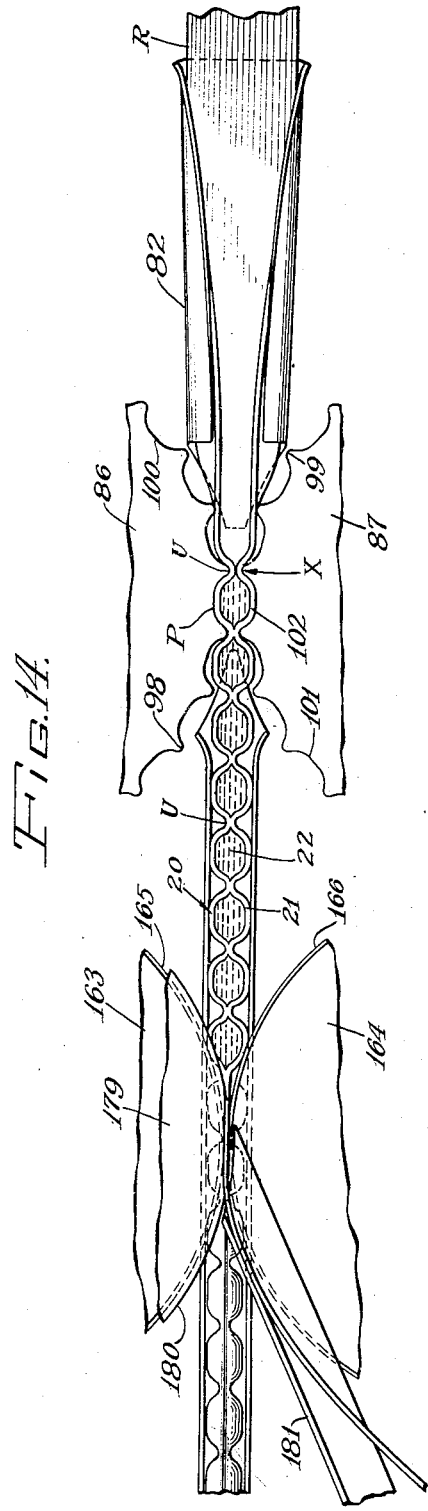
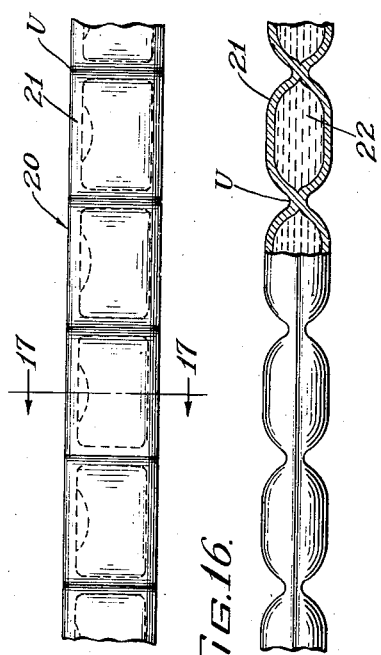
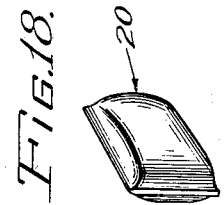
Inventor:
Alfred J. Lautmann
By Bell, Wallace and Cannow
Attorneys Patented Feb. 23, 1943

2,311,923

UNITED STATES PATENT OFFICE 2,311,923

COUGH DROP

Alfred J. Lautmann, Detroit, Mich., assignor to Iodent Chemical Company, Detroit, Mich., a corporation of Michigan Application June 8, 1939, Serial No. 278,040

6 Claims. (Cl. 167—82)

This invention relates to cough drops and the like and to the manufacture thereof, including machines wherein such articles may be produced, and the salient object is to produce an article, such as a cough drop or the like, embodying an edible shell enclosing a liquid or somewhat viscous center and which may be handled and stored in the manner customary for such articles without likelihood of damage thereto or deterioration thereof due to the liquid or other center or for other kindred reasons.

It is also among the objects of the present invention to provide a cough drop or the like which, when dissolved in the mouth, will insure dispersion of medicaments on the tissues of the mouth and throat and the retention of such medicaments in contact with the tissues of the mouth and throat for a longer period of time than has been possible heretofore by the use of conventional cough drops and the like.

Another object is to provide a cough drop embodying an edible hard candy shell and a medicated liquid center and which, until use thereof, will retain its medicated liquid center without deterioration, and which is so composed that the edible hard candy shell is permanently impervious and resistant to any solvent action of the liquid center, that is to say, the edible hard candy shell is insoluble in the liquid center enclosed thereby.

Still another object is to provide a cough drop having a hard, edible candy shell and a medicated liquid center and in which the composition of the medicated edible shell or casing differs from the composition of the medicated liquid center so as to be unaffected by and impervious to the solvent action of the latter.

An additional object of the invention is to afford a vegetable oil that is substantially odorless and tasteless and that is in no way harmful, physiologically or otherwise, to the body when the oil is consumed and which is otherwise free of objectionable properties such as mineral oils might possess, and an ancillary object is to enclose such an oil in a shell that is impervious thereto, which is to say, insoluble therein, whereby when the shell and/or the oil carry medicaments suitable for the purpose, a pleasing and effective cough drop or the like is afforded.

A further object is to provide a vegetable oil which is substantially tasteless and odorless and devoid of any "oily" taste, that is to say, it imparts substantially no "oily" sensation or feeling in the mouth or throat when introduced therein, and a related object is to so treat a vegetable oil that the "oiliness" thereof will be eliminated or at least so substantially reduced as to render it inoffensive when tasted.

Another object of the invention is to provide a composition adapted for use not only as a vehicle for medicaments in liquid center cough drops but also in liquid center chocolates and candy confections, in general, for the purpose of acting as a vehicle for dried fruits or the like.

Yet further objects are to provide a cough drop embodying a hard candy shell enclosing a liquid center embodying an oil such as that hereinabove referred to and which shell will dissolve readily when the cough drop is introduced into the mouth to thereby disperse medicaments contained in the shell and/or liquid center, the aforesaid oil serving to retain such medicaments on the tissues of the mouth and throat for a longer period of time than would ordinarily be possible; to incorporate such medicaments that when the aforesaid shell breaks, in the course of the dissolving thereof in the mouth, the resulting release of the liquid center will discharge what is, in effect, a cough medicine or syrup which, especially when medicaments such as are usually employed in conventional cough drops are included in the shell, will effectively assist in the relief of a cough.

A still further object of the invention is to produce articles, such as cough drops and the like, in a novel and efficient manner.

Yet other objects of the invention are to enable the use of conventional machines commonly employed in the manufacture of candy to be employed in the manufacture of the novel articles of the present invention; to facilitate the introduction of a liquid or viscous center in a candy or like material shell; to so initially form the shell that the center may be introduced thereinto and to thereafter close the shell and then effectively encase the liquid or other center; to provide a machine to which the material from which the shell is to be produced may be passed in ribbon or rope form; to reduce the material thus fed to the machine to a ribbon of predetermined dimensions, free of fins and the like; to form a trough from such ribbon of material and to unite the sides of the trough at predetermined intervals without closing the open side of the trough between such unions therein; to employ relatively movable members for uniting the sides of the trough at such intervals and, more specifically, to employ relatively and continuously rotatable members for such function; to form cooperating portions on such members to bring about the aforesaid uniting of the sides of the trough and which will not substantially alter the position of the portions of the trough between the points of union of the sides thereof whereby openings are afforded at regular intervals through which a liquid or viscous substance may be introduced into the trough into which the material of the shell is formed; to perform the ribbon and trough forming operation and the uniting of the sides of the trough in a continuous manner; to effect a filling operation, as by introducing a liquid or viscous substance into the aforesaid openings in the trough into which the material of the shell is formed, without interrupting the continuous advance of the material; to introduce a predetermined quantity of the aforesaid substance through each of the aforesaid openings and to enable such quantity to be varied as desired; and to introduce a quantity of the substance less than that required to fill the area into which it is introduced whereby, when the area is closed off, a bubble will be produced, an object ancillary to the foregoing being to employ such material for the aforesaid trough of material, which is to afford the shell of the finished articles, that the shell will be at least translucent so that the aforesaid bubble may be observed therethrough.

Still further objects are to effectively close the aforesaid openings between the unions of the sides of the trough to thereby effectively seal the substance within the shell; to effect such closing of the openings without interrupting continuous advance of the material of the shell; to discharge the material, after the closure of the aforesaid openings, onto means operative to effect separation of the material at the aforesaid places where the sides of the aforesaid trough are united to thereby afford the separate articles; and to thereafter tumble or otherwise handle the articles to free them of fins or the like.

More specific objects are to provide a novel machine wherein the aforesaid operations of forming, uniting, filling and closing operations may be carried out in a continuous, automatic and expeditious manner; to so time various operative parts in the machine that the aforesaid operations will be so performed that the material for the shell of the articles will pass through the machine without being unduly stretched or crowded; to enable variation in the speed of operation of various operative parts and thereby insure attainment of the just referred to desirable ends; to enable relatively plastic material to be handled in the machine; and to cool or chill the material, when heated and warm material is passed through the machine, immediately upon discharge thereof from the machine.

Other and further objects of the present invention will be apparent from the following description and claims and are illustrated in the accompanying drawings which, by way of illustration, show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Figs. 1 and 1A, when Fig. 1A is joined with Fig. 1 at the right-hand end thereof, constitute a side elevation of the entire apparatus in which articles, such as cough drops, to which, among other things, this invention pertains may be produced;

Fig. 1B is a sectional view taken substantially on the line 1B—1B on Fig. 1;

Fig. 2 is a side elevation of the machine wherein the aforesaid forming, uniting, filling and closing operations are carried out;

Fig. 3 is a top plan view of the machine illustrated in Fig. 2;

Figs. 4 and 5 are vertical transverse sectional views taken substantially and respectively on the lines 4—4 and 5—5 on Fig. 2;

Fig. 6 is a sectional detail view taken substantially on the line 6—6 on Fig. 3;

Fig. 7 is a sectional detail view taken substantially on the line 7—7 on Fig. 6;

Fig. 8 is a perspective detail view of a portion of the filling head;

Fig. 9 is a plan view, drawn to an enlarged scale, of the devices which effect the aforesaid forming, uniting, filling and closing operations;

Fig. 10 is a longitudinal sectional view taken substantially on the line 10—10 on Fig. 9;

Fig. 11 is a vertical transverse sectional detail view taken substantially on the line 11—11 on Fig. 9;

Figs. 12 and 13 are sectional detail views taken substantially and respectively on the lines 12—12 and 13—13 on Fig. 10;

Fig. 14 is a fragmentary view, similar to Fig. 9, showing the material passing through the parts of the apparatus illustrated therein;

Fig. 15 is a side elevation of the material from which the outer shell of the articles is formed illustrating the same in the condition in which it passes from the parts which effect the closing operation;

Fig. 16 is a plan view of the material as illustrated in Fig. 15;

Fig. 17 is a transverse sectional detail view taken substantially on the lines 17—17 on Fig. 15; and Fig. 18 is a perspective view of a typical article, such as a cough drop, that may be produced in the apparatus shown in the hereinabove described drawings.

Before describing the apparatus illustrated in the accompanying drawings, a typical article such as may be produced in such apparatus is first described with reference to Figs. 17 and 18 wherein a cough drop, generally indicated by 20, such as may be produced in the apparatus illustrated in the accompanying drawings is shown. This cough drop, in its illustrated form, comprises an edible hard candy shell 21, which may or may not be medicated as desired, and in the present instance a medicated liquid center 22. The edible hard candy shell may be made from any suitable hard candy recipe or formula such as has been used in the making of cough drops and confections, and such recipe or formula may have as the base thereof a mixture of sucrose, corn syrup and water, cooked according to known methods, or may be a syrup prepared by dissolving invert sugar, sucrose and water. Typical recipes or formulae suitable for the purpose are as follows:

*Example No. 1:*                         Pounds
    Sucrose -------------------------------- 260
    Invert sugar ---------------------------- 53
    Water ---------------------------------- 83

*Example No. 2:*                         Pounds
    Sucrose -------------------------------- 210
    Corn syrup ----------------------------- 90
    Water ---------------------------------- 70

Especially where a cough drop is to be produced, it is desirable to medicate the candy shell and this may be done by the use of medicaments commonly employed for this purpose. Among the medicaments which may be used in this way are the following, any one or more or all of which may be employed, it being understood that the following are merely exemplary of the medicaments that may be used and that the list is by no means exhaustive, the medicaments to which reference is thus made being: Menthol, Extract of Licorice, Extract Cocillana, Extract Senega, Extract Yerba Santa, Extract Euphorbia, Extract Lactucarium, Chlorthymol, Thymol, and Eucalyptol. These medicaments or their equivalents or kindred medicaments or one or more or all of such medicaments may be respectively used in quantities common in the art but, by way of example, if the shell is to be made according to the recipe of Example No. 1, supra, then the following medicaments in the following proportions may be employed with satisfactory results:

*Example No. 3:*          Grains
    Extract Euphorbia _____ 10000
    Extract Lactucarium _____ 6000
    Extract Cocillana _____ 3200
    Extract Senega _____ 2800
    Extract Licorice _____ 12000
    Menthol _____ 4800

*Example No. 4:*          Grains
    Menthol _____ 6000
    Thymol _____ 3000
    Eucalyptol _____ 2000

In a cough drop, if the liquid center 22 were merely a vegetable oil, this alone would be advantageous for such oil would have a soothing effect upon the tissues of the mouth and throat and would also facilitate the dispersion of the medicaments included in the candy shell over such tissues, when the candy shell dissolves in the mouth to such a state that it breaks and permits dispersion of the liquid center. However, much more efficacious results may be realized by so compounding the liquid center of the cough drop that it constitutes a cough medicine, that is, so that it will be a liquid of medicinal action, which will alleviate irritation in the mouth and throat. It will be recognized that if the liquid center has these properties it will not be essential to include medicaments in the hard candy shell but so to do is quite advantageous, and the preferred embodiment of my invention contemplates that medicaments will be included in both the shell 21 and the liquid center 22 of the cough drop 20.

A suitable oil for use as the liquid center 22 and which will serve as a carrier for one or more medicaments which may be dissolved therein or otherwise carried thereby is Sesame oil, and preferably imported Sesame oil, to which may be added cocoanut oil, cocoanut oil olein or cocoanut stearine, and a mixture of Sesame oil with two or more of these other substances may also be employed. The vegetable oil that is thus afforded is admirably suited for use as the liquid center of the articles contemplated by the present invention inasmuch as it is substantially tasteless and odorless and does not produce a marked oily sensation when the shell 21 dissolves in the mouth thus permitting discharge of the liquid center onto the tissues of the mouth and throat. Furthermore, an oil of the character to which reference has just been made is quite advantageous in the present invention for the additional reason that a hard candy shell, such as has been described hereinabove, is permanently impervious and resistant to any solvent action of such a liquid center, which is to say, a candy shell of this nature is insoluble in a liquid center of this type. Therefore, articles of the kind to which this invention pertains may be handled and stored in the manner customary for such articles, which may mean that the articles will be stored for relatively protracted periods before the use thereof, and by reason of the insolubility of the candy shell in the liquid center objectionable deterioration of the articles will be avoided.

It has been found, in this connection, that the addition of about ten percent (10%) by volume cocoanut oil stearine or about fifty percent (50%) by volume of cocoanut oil olein to Sesame oil or to other of the vegetable oils, as corn, peanut or cottonseed, substantially reduces the oily character or "oiliness" of the oil and particularly Sesame oil, as well as of the vegetable oil mixture thus formed, and provides an excellent base or carrier for the liquid center 22 of the new cough drop and one which is substantially free from any "oily" taste or sensation when the liquid center 22 of the new cough drop is discharged onto the tissues of the mouth and throat.

It has also been found that cocoanut oil, per se, has a similar effect in reducing the "oily" character of vegetable oils, although to a less degree than cocoanut oil stearine, which is the most efficient substance thus far found for this purpose. Further, cocoanut oil olein is somewhat less efficient and less desirable for the purpose but may be used.

The exact explanation of the phenomenon of reduction in the "oiliness" of vegetable oils, referred to above, is not known, nor is the phenomenon entirely understood. However, it is believed to be caused by, or to be a function of, the reduction in the surface tension and viscosity of the oil which are known to be caused by the addition of the modifying agent or mixture of agents thereto.

As a further explanation of the foregoing attention is directed to the following table:

| | Sesame | Corn | Peanut | Cottonseed | Cocoanut oil | |
| | | | | | Stearine | Olein |
|---|---|---|---|---|---|---|
| Surface tension (dynes) at 27.5C | 37.4 | 37.4 | 37.0 | 37.3 | | 35.2 |
| Surface tension (dynes) at 98F | 36.9 | 37.1 | 36.7 | 36.9 | 34.6 | 34.85 |
| Viscosity (centipoises) | 33.9 | 31.9 | 37.6 | 31.1 | | 28.0 |

Now if ten percent (10%) of cocoanut oil stearine is added to the refined Sesame oil, the surface tension at 27.5° C. is reduced from 37.4 to 37.4 dynes, and if fifty percent (50%) cocoanut oil olein is added to such Sesame oil, the surface tension at 27.5° C. is reduced to 36.3 dynes, and if fifty percent (50%) cocoanut oil olein is likewise added to refined Sesame oil, the viscosity of the Sesame is reduced from 33.9 centipoises to 30.5 centipoises. Whenever such reductions are effected there is an attendant drop in "oiliness."

From the foregoing, and while it is not definitely known, it may be deduced that there is a relationship between surface tension and viscosity and "oiliness" of a vegetable oil. Sesame oil of itself seems to possess less "oily" sensation than other vegetable oils but this may be due to lack of taste. Corn oil, on the other hand, seems to have a definite "oily" sensation but this may be due to the presence of a pronounced taste. However, by reference to the surface tension and viscosity of these oils, a great difference in "oiliness" should not be expected. But when cocoanut oil olefin or stearine, or cocoanut oil itself, is added to such oils there is surface tension and viscosity and an attendant reduction in "oiliness." Thus, the preferred vehicle or carrier adapted for use as the liquid center 22 or elsewhere, in those instances where lack of "oiliness" is important, is a vegetable oil which has had the oily sensation thereof reduced by the addition thereto of cocoanut olein or stearine, or cocoanut oil itself, or a combination of such substances.

Suitable formulae for making the liquid center 22 of the cough drop 20 and embodying an oil such as that just described are represented by the following examples, in which all parts indicated are by weight:

*Example No. 5:* (Liquid center)         Parts
    Vegetable oil base (Sesame oil) _____ 90.0
    Cocoanut oil stearine_____ 10.0
    Medicaments
        (a) Menthol _____ 0.45
        (b) Thymol _____ 0.075
        (c) Emetine _____ 0.025

*Example No. 6:* (Liquid center)
    Vegetable oil base (Sesame oil) _____ 70.0
    Cocoanut oil olein_____ 30.0
Medicaments
        (a) Menthol _____ 0.60
        (b) Thymol _____ 0.10
        (c) Oil of turpentine_____ 1.25

*Example No. 7:*
    Vegetable oil base (Sesame oil) _____ 80.0
    Cocoanut oil_____ 20.0
    Medicaments
        (a) Menthol _____ 0.38
        (b) Thymol _____ 0.06
        (c) Terebene _____ 1.25

It is to be understood from the foregoing that in the preferred embodiments of my invention the shell 21 and the center 22 will be made of substances which are unlike and which are mutually insoluble one in the other for when this condition prevails it is not necessary to line the shell or to take steps to prevent dissolving of the shell in the center or absorption of the shell in the center.

It is to be understood that whole Sesame oil is preferred as the base for the liquid center 22, other vegetable oils, or mixtures of vegetable oils, may be used although probably with less satisfactory results, and among such oils are corn oil, cottonseed oil and peanut oil which also may be used with one or more of the following, namely, cocoanut oil, cocoanut oil olein or cocoanut oil stearine.

The medicaments indicated in the foregoing formulae are typical of those which may be employed, and it will be understood that a wide variety of medicaments may be employed for the purpose, the underlying utility being to afford, as explained above, a cough preparation. Inasmuch as this invention is not primarily directed to the particular medicaments which are employed and primarily since a wide variety of other medicaments may be used within the purview of my invention, it is believed that the foregoing examples are sufficient for the purpose of this disclosure, and inasmuch as the functions and properties of such medicaments are well understood, further description thereof is not included herein.

While liquid center cough drops and similar articles to which the present invention pertains may be produced in a wide variety of ways, I have found that the apparatus illustrated in the accompanying drawings is particularly suitable for the purpose inasmuch as it enables attainment of the hereinabove set forth objects of the present invention and materially expedites the production of such articles in a relatively inexpensive manner.

In the main the apparatus employed in the manufacture of such articles includes a cooker, a cooling table, a mixing slab (none of which apparatus is illustrated in the accompanying drawings since it is conventional and well-known), a batch roller or plasticizer M, Fig. 1A, the machine illustrated in detail in Figs. 2 to 14, inclusive, and which is generally indicated at A in Fig. 1A, and the conveyor apparatus, generally indicated by C, Fig. 1, each of which devices will now be explained in detail.

The plasticizer or mixer M may be any of various such devices that are employed in the confectionary art and that illustrated herein is of the type commercially known as a York batch roller and comprises a compartment 25 in which suitable agitating means (not shown) are provided that are driven from the motor 26 mounted on the frame 27 of the mixer M. The ingredients from which the shells 21 are to be produced are preferably cooked together in a vacuum cooker, in the manner well understood in the art. This material is then poured onto a cooling table and the medicaments (if such are to be used) are introduced into the partially cooled mass for so to do prevents decomposition of the medicaments. After the medicaments are well folded into the semi-plastic mass, the entire batch is introduced into a batch roller or plasticizer, such as M, which serves to agitate the mass slowly under heat to further mix in the medicaments and to keep the mass in a workable state for the operator or spinner to draw out or spin on the table T a "rope" of such a size that a ribbon R, Fig. 14, of predetermined width and thickness will be produced as this rope of material passes through the sizing rollers 28 and 29, Fig. 2, of the machine A, the ribbon R being deposited on a feed trough 30 which leads to the bite between the rollers 28 and 29, as best shown in Figs. 1A, 2, 3 and 10, the trough 30 being supported by suitable brackets as 31 from the bed B of the machine A, which bed, as best shown in Fig. 1A, is supported by legs 32 or the like from the floor or other support on which the frame 27 of the mixer M is rested.

A bearing bracket 33, Fig. 2, is mounted on the bed B and extends upwardly therefrom and has a split bearing 34 and a closed bearing 35, Fig. 4, formed therein in vertical alignment. A flanged bearing bushing 36 is passed through the split bearing 34 and is clamped therein with the flange 37 at one end thereof engaging one side of the bearing bracket 33 by bolts 38 passed through the ears 38' of the split bearing 34. A shaft 39 is journaled in the bearing bushing 36 and the roller 28 is keyed or otherwise suitably secured to this shaft with one face of the hub thereof engaged with the flange 37 and with the other face of the hub engaged with the flange 40 of the bearing bushing 41 clamped in the split bearing 43 of the outboard bearing structure 42.

As best shown in Figs. 2 and 4, the bearing bores in the bearing bushings 36 and 41 are preferably eccentric to the peripheries of such bearing bushings wherefore when the split bearings 34 and 43 are loosened the bearing bushings 36 and 41 may be rotated in the openings in which they are mounted and thereby the vertical position of the roller 28 may be varied, the utility of this arrangement being explained presently.

A bearing bushing 44 is mounted in the closed bearing in the bearing bracket 33 and a shaft 45 is journaled therein, this shaft also being journaled in a bearing bushing 46 in the outboard bearing structure 42. The roller 29 is keyed or otherwise suitably secured to the shaft 45 intermediate the flange 47 provided on the bearing bushing 44 and the adjacent end of the bearing bushing 46, the shaft 45 being held against longitudinal movement in one direction in the bearing bushings 44 and 46 by a washer 49 secured to the outer end of such shaft, this washer engaging the flange 48 on the adjacent end of the bearing bushing 46. The shaft 45 is held against longitudinal movement in the other direction by reason of the engagement of the hub 50 of the worm wheel 51 with a collar 50' that engages the adjacent wall of the gear box G, the worm wheel 51 being pinned to the shaft 45.

Another worm wheel 52 is keyed or otherwise suitably secured to the shaft 39 and meshes with a worm gear 52' fast to a shaft 53 journaled in suitable bearings in the gear box G. The worm wheel 51 meshes with a worm gear 51' that is also fast to the shaft 53. The shaft 53 has a worm wheel 54 keyed or otherwise secured thereto, and this worm wheel meshes with a worm gear 59 fast on the shaft 60 that is journaled in a bearing in the gear box G and in a bearing in the bearing block 33. A pulley 63 is fast on the shaft 60 outwardly of the gear box G and a belt 64 is passed thereabout and about a pulley 65, Fig. 3, fast on the power take-off shaft of a variable speed reducer 66, Figs. 1A and 3, that is mounted on the floor or other support on which the machine A and mixer M are rested. A motor 70 is directly connected to the power input shaft of the speed reducer 66, which may be of conventional form. Thus when the motor 70 is set in operation, power is transmitted therefrom and through the speed reducer 66 to the shaft 60 and thence through worm gear 59 and worm wheel 54 to shaft 53 and thence through worm gears 51' and 52' to worm wheels 51 and 52, wherefore the shafts 39 and 45 are set in operation. The ratios between worm gears 51' and 52' and the worm wheels 51 and 52 with which they respectively mesh is one-to-one wherefore the shafts 39 and 45 rotate synchronously as do the rollers 28 and 29 fast thereon.

By referring to Fig. 4, it will be seen that a pair of ribs 71 and 72 are provided on the periphery of the roller 28 and that these ribs ride on the periphery of the roller 29 at the edges of a groove 73 formed in the periphery of the roller 29 midway between the edges thereof, whereby an opening 74 of predetermined length and thickness is defined at the bite between the rollers 28 and 29. The dimensions of this opening 74 are those desired of the ribbon R, Fig. 14. It is quite desirable that the ribbon R, when it passes from the bite between the rollers 28 and 29, be free of fins and the like and to this end a bracket K, Figs. 3, 9, and 10, is fast to the bearing bracket 33 to project therefrom, and a plate 75 is secured thereto. Blocks 76 and 77 are secured to the plate 75 and are extended toward the bite between the rollers 28 and 29, each block having a formed surface as 78 thereon, Fig. 10, which fits against the rib as 71 on the roller 28, these curved surfaces 78 terminating just short of the bite between the rollers 28 and 29 as does the inner end of the trough 30 which leads into the groove 73 in the roller 29. Thus as the material which is to be formed into the ribbon R is fed into the trough 30 and toward the bite between the rollers 28 and 29, it passes between the blocks 76 and 77 which guide it to the opening 74.

In order to insure that the material from the mixer M passing along the trough 30 is fed into the bite between the rollers 28 and 29, these rollers are preferably knurled, as indicated at 79 and 80, and these knurls preferably extend transversely, the knurls 79 extending transversely between the ribs 71 and 72 and the knurls 80 being formed in the bottom of the groove 73, the knurls 80 preferably being deeper than the knurls 79 so as to thereby tend to drag the ribbon R down onto the receiving platform 81 which extends into and rides against the bottom of the groove 73 on the discharge side of the opening 74. Thus after the material from the mixer M has passed through the opening 74, it is discharged onto the platform 81 in the form of the ribbon R which, as stated, is of predetermined dimensions and by reason of the feeding effect imparted to this ribbon R by the rotation of the rollers 28 and 29 the ribbon thus formed passes over the platform 81 to the forming trough 82.

The platform 81 is carried by a bracket 83, Figs. 2 and 3, secured to the bearing bracket 33 and, as best shown in Figs. 9 and 10, the discharge end of platform 81 is recessed in its upper edge as indicated at 84 to receive the adjacent end of the forming trough 82 so that the ribbon R will freely slide over the upper surface of the platform 81 into the forming trough 82. The forming trough 82, as best shown in Figs. 3, 9, 10, 12, 13 and 14, has the side edges thereof, inwardly from the receiving end thereof, gradually flared inwardly so that as the ribbon R passes therethrough the side edges thereof are folded upwardly toward each other to thereby arrange the ribbon in trough-like formation, that is to say, substantially U-shaped in cross-section with the opening of such trough-like formation disposed upwardly. The forming trough 82 includes a discharge tongue 85 which, as best shown in Fig. 10, leads downwardly to be in substantial alignment with the lower edges of forming rollers 86 and 87, to be described more fully hereinafter. In order to insure such alignment of the discharge end of the discharge tongue 85, the forming trough 82 is adjustably supported in position in the following manner. As best shown in Figs. 2, 3, 9, 10 and 13, a post 88 extends upwardly from a socket 88' on the bed B. The lower end of the post 88 is adjustably secured in the socket 88' and these parts are arranged in alignment with the discharge trough 82. The post 88 carries a block 89 at the upper end thereof. The block 89 has arms 90 and 91 projecting outwardly from that portion thereof aligned with the trough 82, and other arms 92 and 93 extend upwardly from the block 89 in alignment with the post 88. A block 94 is medially mounted on a pin 95 carried by the arms 92 and 93 and screws 96 and 97 pass through the arms 90 and 91 and engage the underside of the block 94 on opposite sides of the pin 95. It will therefore be seen that by adjusting the relative positions of the screws 96 and 97 and the positioning of the post 88 in the socket 88', the positioning of the forming trough 82, which rests on the block 94, may be adjusted so as to properly dispose the discharge tongue 85 relative to the forming rollers 86 and 87.

The forming rollers 86 and 87, as best illustrated in Fig. 3, have ribs 98 and 99 respectively extended across the peripheries thereof at regularly spaced intervals, whereby pockets 100 and 101 are respectively defined in the peripheries of the rollers 86 and 87. When, in the manner explained presently, the rollers 86 and 87 are set in rotation, the ribs or teeth 98 and 99, Fig. 14, thereon are adapted to cooperate one with the other to thereby squeeze sides of the now substantially trough-like ribbon R together at intervals, generally indicated by U in the ribbon R, and as the sides of the ribbon R are so squeezed together parts of the ribbon R of a length substantially equal to the cough drop 20 in the present instance lie in a pocket P at the bite between the rollers 86 and 87 afforded by cooperating pockets 100 and 101 in the rollers 86 and 87, respectively. The part of the ribbon R which thus lies in the pocket P and which is to eventually constitute, in the present instance, a cough drop 20, is for the purpose of this description generally indicated by 102, and such part 102 is substantially U-shaped in cross-section midway in the longitudinal extent thereof, being open at the top and closed at each end by unions U and being closed at the bottom by reason of the substantially U-shaped or trough-like shape of the ribbon R.

In order that the ribbon R will be united at the points U, as just described, without impairing the advance thereof through the machine and particularly without unduly stretching or crowding the ribbon, it is essential that the rollers 86 and 87 operate synchronously with the rollers 28 and 29 and the rollers 86 and 87 are so mounted and operated, as will now be described.

As best shown in Figs. 2 and 3, a housing H is mounted on the bed B and has bearings, generally indicated by 103 and 104, Fig. 5, in opposite sides thereof in which a shaft 106 is journaled, this shaft also being journaled in the outboard bearing 107, Fig. 5, at the outer end of a sleeve 108 that projects from the side of the housing H at which the bearing 103 is provided. A variable speed pulley 109, Fig. 3, preferably of conventional design and including opposed conical surfaces between which the sides of a V-shaped belt 110 or the like may be disposed, is fast on the shaft 106 and the belt 110 is also passed about a fixed conical pulley 111 fast on the shaft 60. It will be recalled that the rollers 28 and 29 receive motion from the shaft 60 and hence by reason of the variable speed arrangement afforded by the pulley 109 and the belt 110 and by reason of the mounting of the pulley 111 on the shaft 60, it will be apparent that, by properly adjusting the pulley 109, the shaft 106 may be operated in definite timed relation with the shaft 60 and therefore the rollers 28 and 29.

The rollers 86 and 87 are adjustable relative to each other and to this end the rollers 86 and 87 are adjustably secured to plates 112 and 113, the rollers 86 and 87 being shouldered as indicated at 114, Fig. 5, so that a portion of each of these rollers overlies the cooperating plate 112 or 113. A slot, as 115, Fig. 3, is provided in the part of each roller 86 or 87 that overlies the cooperating plate and a bolt or other suitable securing means 116 is passed through such slot and is fast in the underlying portion of the plate 112 or 113. Thus, each roller 86 and 87 is movable on the plate 112 or 113 on which it is mounted, and this enables the rollers 86 and 87 to be accurately adjusted so as to insure accurate cooperation of the ribs or teeth 98 or 99 thereon to produce the unions U.

By referring to Fig. 5, it will be seen that bearing sleeves 117 and 118 are mounted on the upper side of the housing H and that bushings 119 and 120 are respectively provided therein to afford journals for the shafts 121 and 122. The plate 112 is pinned or otherwise suitably secured to the shaft 121, and the hub of this plate rides on the top of a flange provided on a bushing 119. The plate 113 is pinned or otherwise suitably secured to the shaft 122 and the hub of this plate rides on a flange provided on the bushing 120. The shafts 121 and 122 are so spaced one from the other that proper cooperation of the ribs or teeth 98 and 99 on the rollers 86 and 87 to produce the unions U thereof is assured, this spacing of the shafts 121 and 122 being such that when ribs 98 and 99 are in cooperating relation at the point X, Fig. 14, a union U will be produced in the ribbon R. The bearing sleeve 118 is preferably split and the bushing 120 mounted therein has the periphery thereof eccentric to the bearing bore therein. This enables adjustment of the shaft 122 relative to the shaft 121 which enables the aforesaid relation between the shafts 121 and 122 to be established and maintained.

A worm wheel 123 is fast at the lower end of the shaft 121 and meshes with a worm gear 124 fast on the shaft 106. A worm wheel 125 is fast at the lower end of the shaft 122 and meshes with a worm gear 126 also fast on the shaft 106. The worm gear 124 has a right-hand lead while the worm gear 126 has a left-hand lead and this causes the shafts 121 and 122 to be rotated in opposite directions as will also the rollers 86 and 87. It will be recalled that the shaft 106 is arranged to insure synchronic operation thereof with the rollers 28 and 29 and, therefore, since the ratios between the worm gear 124 and the worm wheel 123 and between the worm gear 126 and the worm wheel 125 are one-to-one, it is manifest that synchronic operation of the rollers 86 and 87 with each other and with the rollers 28 and 29 is assured.

As soon as each part as 102 of the ribbon R has been formed and while and during the time it is passing through the pocket P at the bite between the rollers 86 and 87, the liquid center 22 hereinabove referred to is introduced thereinto, it being understood that the rollers 28 and 29 and 86 and 87 rotate continuously during the operation of the machine. In order to bring about such introduction of the liquid or other viscous substance into the parts 102 of the ribbon R at such time, the filling head, generally indicated by F, is provided. The filling head F includes a collar 127, Fig. 5, that is disposed about a post 128 which has the lower end thereof secured in a boss 129 on the top of the housing H, a set screw 130, Fig. 3, or other suitable means, being provided for clamping the collar 127 in adjusted vertical positions on the post 128.

An arm 131, Fig. 3, projects from the collar 127 and has as a part thereof bearing housings 132 and 133. A circular plate 134, Fig. 7, is provided and has a peripheral flange 135 projected from one face thereof and a centrally located sleeve 136 projecting from the other face thereof. Still another circular plate 137 is provided which is adapted to be disposed in engagement with the face of the plate 134 from which the sleeve 136 projects, and this plate 137 has a flange 138 extending from one face thereof to overlie the periphery of the peripheral flange 135 on the plate 134, the flange 138 being located inwardly of the periphery of the plate 137. A centrally located sleeve 139 extends from the face of the plate 137 opposite that from which the flange 138 projects, and the sleeve 136 on the plate 134 is adapted to be received within the sleeve 139. The sleeve 139 in turn is received in the bearing housing 132. Still another circular plate 140 is provided and this plate is equipped with a peripheral flange 141 that is disposed to overlie the periphery of the flange 138, and preferably the periphery of the flange 141 is aligned with the periphery of the plate 137, and the flange 141 is preferably shorter than the flanges 135 and 138 which it overlies so that the free ends of these flanges will engage the inner face of the plate 140. In view of the foregoing construction, the flange 141 terminates in spaced relation with the plate 137, and a gasket 142 is interposed between these parts for, as will be explained presently, the plate 140 and the flange 141 are adapted to rotate relative to the plates 134 and 137 and the flanges 135 and 138.

The plate 140 has a centrally located hub 143 thereon into which one end of a shaft 144 is extended so that the hub 143 may be fast to the shaft 144. The shaft 144 extends through and is journaled in the sleeve 136 and has a gear 145 fast thereon at the free end of the sleeve 136 whereby, by reason of the connection of the hub 143 to the shaft 144, the parts of the filling head F thus far described are firmly clamped together.

It is essential that the filling head F and, more specifically, the flange 144 thereof, rotate synchronically with the rollers 86 and 87 and 28 and 29, and to this end a bevel gear 146, Fig. 5, is fast to the shaft 121 and this bevel gear meshes with a bevel gear 147 that it rotatable about a stud shaft 148 carried by the bearing housing 133 of the arm 131. The bevel gear 148 is fast to the pinion 149 that meshes with the gear or pinion 145 fast on the shaft 144. Thus when the shaft 106 is rotated synchronically with the rollers 28 and 29, as above described, it is apparent that, through the just described gear train, the plate 140 and the flange 141 thereon may be rotated in timed relation with the advance of the ribbon R through the machine.

In view of the fact that the flange 141 will thus advance in synchronism with the ribbon R, filling spouts 150 are led from the periphery of this flange at regularly spaced intervals, the intervals being such that, as each part 102 moves through the pocket P, a filling spout 150 will be aligned therewith and will move therewith, and the center as 22 that it to be incorporated in the articles as 20 is introduced into the parts 102 during such synchronic advance of each part 102 and a filling spout 150. To this end a tank T, Fig. 1A, is provided which has associated therewith a suitable constant liquid level maintaining device D to which a liquid supply pipe 151 is directed, a pipe 152 leading from the device D to the tank T to insure that a constant level of liquid is maintained within the tank T, whereby a constant hydrostatic head is established and maintained in the tank T.

A pipe 153 leads from the bottom of the tank T to a bore 154, Fig. 7, in the shaft 144, a suitable packing gland 155 being provided to prevent leakage at the point of interconnection of the pipe 153 with the bore 154. A valve 156 is provided in the pipe 153 in order that the supply of liquid from the tank T to the bore 154 may be closed off. An outlet opening 157 leads from the bore 154 to the liquid chamber 158 defined between the adjacent faces of the plates 134 and 140 and surrounded by the flange 135. Thus, when the valve 156 is opened, liquid from the tank T flows into the chamber 158 and liquid flows from the chamber 158 through openings 159 and 160 respectively provided in the flanges 135 and 138.

It will be recalled that the sleeve 136 of the plate 134 is journaled in the sleeve 139 of the plate 137 and that the sleeve 139 in turn is journaled in the bearing housing 132. At least parts of the openings 159 and 160 are maintained in alignment with each other, and these openings are so located circumferentially about the shaft 144 that at the time a filling spout 150 is about to move into alignment with a part 102 in the pocket P, this filling spout will be in communication with the aligned portions of the openings 159 and 160 whereby liquid from the chamber 158 may flow through these openings into the filling spout 150. It will be manifest that the inlet of each filling spout will move into alignment with the opening 160 and the arrangement is preferably such that during the time the inlet of the filling spout is moving across the opening 160, such an amount of liquid will pass from the chamber 158 to the filling spout that the desired quantity of liquid will be introduced into each part 102. However, it will be apparent that, by reason of the mounting of the plates 134 and 137, it is possible to move the openings 159 and 160 relative to each other and by reason of this the intercommunication between the openings 159 and 160 may be so adjusted that only the desired amount of liquid can flow through both of these openings to a particular filling spout, and when such relative positioning of the openings 159 and 160 is attained the set screw 161, Fig. 7, is tightly engaged with the sleeve 139 to thereby retain the plate 137, flange 138 and opening 159 in their adjusted positions, and the set screw 162, Fig. 7, is seated in engagement with the sleeve 136 to thereby retain the plate 134 and the flange 135 in their adjusted positions.

A vent cock V is arranged in communication with the chamber 158 and this cock is opened to permit escape of air from the chamber 158 until the desired level of liquid has been introduced into the said chamber 158.

As can best be seen by reference to Figs. 7 and 8, the filling spouts 150, in the present instance, are of substantially circular configuration throughout the major portion of the extent thereof, but at the discharge ends these spouts are preferably flattened into substantially oval configuration. I have found that so to do prevents objectionable dripping from the ends of the spouts as each is moving away from the particular part 102 with which it is adapted to cooperate, and this is particularly advantageous where a somewhat oily substance is being introduced into the parts 102 for this prevents this substance from dripping onto the outer surfaces of such parts. It will be understood, however, that any desired configuration may be employed in the filling spouts for in some instances it may be desirable to employ spouts of a configuration other than that shown. Moreover, the number of spouts provided may be varied as desired so that a spout will always be in position to cooperate with a part as one of the parts 102.

Preferably the quantity of liquid introduced into each part 102 is less than that which would entirely fill the chamber defined within each such part when the edges at the open side thereof are joined to encase the center as 22 within the shell as 21 so that a bubble will be formed in each such part 102 which, as stated, when separated from each other in the ribbon R, afford the articles as the cough drops 20. It is because of the formation of such a bubble that it is preferable to form the material shaped into the ribbon R of a substance which will at least be translucent if not transparent so that when a bubble as aforesaid is produced it will be visible, it having been found that so to do increases the salability of the present article inasmuch as attention is more readily directed to the liquid center therein.

The just referred to closing of the open sides of the parts 102 is effected by the closing rollers 163 and 164 which, as best shown in Figs. 2 and 11, are in the form of circular discs which have flanges projecting from the upper parts thereof and, as best illustrated in Fig. 11, these flanges are preferably so beveled that knife edges 165 and 166 are formed thereon, these knife edges cooperating one with the other in the course of the operation of the closing rollers 163 and 164. Those portions of such flanges immediately below the knife edges 165 and 166 are knurled as indicated at 167 and 168 and it is the cooperation of these knurled surfaces 167 and 168 and the knife edges 165 and 166 that brings about the closing of the open sides of each part 102 as it passes therebetween.

By referring to Fig. 10 it will be seen that the discharge finger 85 of the forming spout 82 terminates at one side of the pocket P at the bite between the rollers 86 and 87, and the receiving finger 169 of the guide trough 170 is similarly spaced from the pocket P. Thus, as a part 102 of the ribbon R is passing through the pocket P, it is solely supported by the cooperation of ribs or teeth 98 and 99 but, prior to the time such teeth move into cooperating relation in advance of the position of the pocket P, the ribbon R is supported by the finger 85, and as soon as the teeth 98 and 99 start to move out of cooperating relation the ribbon R is picked up by the finger 169 and fed into the trough 170.

The trough 170, as can best be ascertained by reference to Figs. 2, 3, 9 and 11, leads to and extends beyond the bite between the rollers 163 and 164 and, as best shown in Fig. 1, discharges the articles onto the conveyor mechanism C to be described presently. The trough 170 is carried by adjustable brackets 170a and 170b to enable proper adjustment thereof relative to the parts with which it cooperates.

It is essential that he closing rollers 163 and 164 operate in synchronism with the other mechanisms herein described as operating synchronically, and to this end a conical pulley 171, similar to the pulley 111, is fast on the shaft 106, and a belt 172 is passed thereabout and about a variable speed pulley 173 fast on the shaft 174 that is journaled in a bearing 175 at the end of a sleeve 176 projecting from the housing H and in a bearing in the housing H corresponding to the bearing 104, the pulley 173 being similar to the pulley 109. The rollers 163 and 164 are fast to shafts spaced, journaled and driven in the same manner as that in which the shafts 121 and 122, Fig. 5, are spaced, journaled and driven, which is to say, worm gears 124 and 126 on the shaft 106, drive worm wheels corresponding to the worm wheels 123 and 125 on the shafts 177 and 178 to which the rollers 163 and 164 are respectively connected.

When the knife edges 165 and 166 cooperate with each other to bring about closure of the open sides of the parts 102 in the ribbon R, it is possible that a fin may be formed and in order to eliminate such fin, preferably at the time of formation thereof, a circular trimming knife 179, Figs. 3 and 14, is provided which has a shearing edge 180 thereon that overlies the upper face of the closing roller 164, the knife 179 being disposed above and secured to the closing roller 163. Thus, as the knife edges 165 and 166 close the open sides of the parts 102, any excess material is trimmed off by the edge 180 and then passed to a trough 181 which directs such a trimming from the machine.

It will be understood that the material that is formed into the ribbon R is heated prior to the time it is introduced into the machine A and that, by reason of such heating, the material is in a somewhat plastic condition as it passes through the bites between the rollers 28 and 29, 86 and 87, and 163 and 164. However, as soon as the ribbon R is discharged from the rollers 163 and 164, and passes along the trough 170 to the conveyor mechanism C, it is passed into a trough 182, Fig. 1B, in the mechanism C, and it is preferable that the semi-plastic material be quickly congealed for when this is done such material becomes relatively brittle and separation of the parts 102 of the ribbon R at the points of union U is thereby facilitated. Thus a blower B is provided in the conveyor mechanism C and this blower is driven from motor 183. The intake of this blower may either be connected to a source of cool fresh air or, in some circumstances, to a source of thoroughly chilled air, and the outlet of this blower is so extended that air discharged from the blower flows over the upper side of the pass of the belt 184 of the conveyor whereby the articles lying on this pass in the trough 182 are effectively chilled. The belt or endless conveyor 184 travels from right to left, as viewed in Fig. 1, and as the ribbon R containing completely closed parts 102 moves from the trough 170 onto this pass of this conveyor between the sides of the trough 182, it is carried along from right to left, the conveyor 184 being driven by a belt 185 passing about pulleys 186 and 187 respectively mounted on the shaft 174 and the shaft 188 at the adjacent end of the mechanism C.

The trough 182 extends but a short distance along the upper pass of the conveyor 184 and by the time the ribbon passes from the trough 182 it is relatively brittle and as the ribbon moves along the upper pass of the conveyor 184, due to such brittleness and the agitation imparted thereto from the conveyor, the ribbon separates at the points of union U into articles such as the cough drop 20. When the articles as 20 are thus separated and as they travel along the upper pass of the conveyor, they rub on the conveyor and each other and are thereby so tumbled or otherwise agitated that sharp projecting portions thereon are broken off so that, when the articles pass from the discharge end of the conveyor 184 to be collected for packaging and distribution, they are ready for use and are free of sharp corners and the like which might be objectionable when the articles are introduced into the mouth.

It will be manifest from the foregoing description that I have provided an article such as a cough drop which will embody a shell and a liquid or viscous center and it is believed that it will be apparent from the foregoing description that I have provided a novel apparatus in which such articles may be produced.

It will also be understood from the foregoing description that the articles embody a shell and a center which are made of differing compositions so as to be naturally insoluble whereby objectionable deterioration of the articles is prevented when the articles are handled and stored in the customary manner.

By reason of the fact that the material from which the shell of the articles is to be produced may be fed through the machine in the form of a continuous ribbon, it is possible to rapidly produce the articles and it is possible to so pass a continuous ribbon through the above described machine by reason of the fact that the various mechanisms that operate upon the ribbon may be timed to operate synchronically whereby undue stretching or cramping or crowding of such a ribbon is effectively prevented.

Moreover, it will be apparent from the foregoing description that I have devised a novel and efficient manner for introducing the center into the articles without interrupting the continuous advance of the aforesaid ribbon through the machine and I have so arranged this apparatus that a predetermined quantity of liquid or the like may be introduced into each such article. Furthermore, the apparatus is so arranged that the quantity of material introduced into each article may be expeditiously varied, if desired, and where a translucent or transparent article is to be produced the quantity introduced into the center of each article may be such that a bubble may be produced which tends to increase the attractiveness and the like of the articles.

Furthermore, I have described how a vegetable oil may be introduced into articles such as cough drops to serve as a carrier for medicaments or for other advantageous reasons hereinabove outlined, and I have explained how such an oil may be utilized and produced so that it will be substantially devoid of properties which will tend to produce an oily sensation when the oil is discharged into the mouth.

By the term "aqueous hard candy shell" as employed hereinafter in the claims is meant a shell which is composed of a candy which has been made from a sugar and water, with or without other ingredients which may be employed therewith in making a hard candy shell of the character described herein.

Many other and further advantages of the present invention will be apparent from the foregoing description and while I have illustrated and described the preferred embodiments of my invention, it is to be understood that these are capable of variation and modification and I therefore do not wish to be limited to the precise details set forth but desire to avail myself of such changes and alterations as fall within the scope of the following claims.

I claim:

1. A cough drop or like edible article comprising an edible and medicated hard candy shell and a medicated liquid center enclosed by and contained within said shell, said liquid center containing sesame oil as a medicament-carrying base together with at least one substance selected from the group consisting of cocoanut oil sterine, cocoanut oil olein and cocoanut oil, per se, and being substantially free and devoid of any "oily" sensation when it is discharged onto the tissues of the mouth and throat, and said hard candy shell being permanently impervious and resistant to any solvent action of, and being insoluble in, said liquid center.

2. A cough drop or like edible article comprising an edible and medicated hard candy shell and a medicated liquid center enclosed by and contained within said shell, said liquid center containing a vegetable oil as a medicament-carrying base together with at least one substance selected from the group consisting of cocoanut oil stearine, cocoanut oil olein, and cocoanut oil, per se, and being substantially free and devoid of any "oily" taste, feeling or sensation when it is discharged onto the tissues of the mouth and throat, and said hard candy shell being permanently impervious and resistant to any solvent action of, and being insoluble in, said liquid center.

3. An article comprising an edible hard candy shell and a medicated liquid center enclosed by and contained within said shell, said liquid center containing sesame oil as a medicament-carrying base together with at least one substance selected from the group consisting of cocoanut oil stearine, cocoanut oil olein, and cocoanut oil, per se, and said edible hard candy shell being permanently impervious and resistant to any solvent action of, and being insoluble in, said liquid center.

4. An article comprising a translucent or partially transparent edible aqueous hard candy shell affording an enclosed pocket of predetermined volume, and a medicated liquid center enclosed within said pocket, the volume of the liquid center being less than the volume of the pocket whereby an air bubble is afforded in the pocket, said center comprising an oil base, and said aqueous hard candy shell and said oil base center being permanently free from any tendency to go into solution one with the other.

5. An article comprising a translucent or partially transparent edible aqueous hard candy shell affording an enclosed pocket of predetermined volume, and a medicated liquid center enclosed within said pocket, the volume of the liquid center being less than the volume of the pocket whereby an air bubble is afforded in the pocket, said center comprising a vegetable oil base having incorporated therein a vegetable modifying agent rendering said vegetable oil base substantially free of an "oily" sensation when it is discharged upon the tissues of the mouth and throat, said aqueous hard candy shell and said vegetable oil base liquid center being permanently free from any tendency to go into solution one with the other.

6. An article comprising a translucent or partially transparent medicated edible aqueous hard candy shell affording an enclosed pocket of predetermined volume, and a medicated liquid center enclosed within said pocket, the volume of the liquid center being less than the volume of the pocket whereby an air bubble is afforded in the pocket, said center comprising a sesame oil base together with at least one substance selected from the group consisting of cocoanut oil stearine, cocoanut oil olein and cocoanut oil per se and being substantially free and devoid of an "oily" sensation when it is discharged onto the tissues of the mouth and throat, said aqueous hard candy shell and said sesame oil base center being permanently free from any tendency to go into solution one with the other.

ALFRED J. LAUTMANN.